US011942117B2

(12) United States Patent
Dowling

(10) Patent No.: US 11,942,117 B2
(45) Date of Patent: Mar. 26, 2024

(54) MEDIA MANAGEMENT SYSTEM

(71) Applicant: Blackmagic Design Pty Ltd, Port Melbourne (AU)

(72) Inventor: Matthew Dowling, Port Melbourne (AU)

(73) Assignee: Blackmagic Design Pty Ltd, Port Melbourne (AU)

( * ) Notice: Subject to any disclaimer, the term of this patent is extended or adjusted under 35 U.S.C. 154(b) by 0 days.

(21) Appl. No.: 17/600,978

(22) PCT Filed: Apr. 1, 2020

(86) PCT No.: PCT/AU2020/050322
§ 371 (c)(1),
(2) Date: Oct. 1, 2021

(87) PCT Pub. No.: WO2020/198793
PCT Pub. Date: Oct. 8, 2020

(65) Prior Publication Data
US 2022/0180902 A1 Jun. 9, 2022

(30) Foreign Application Priority Data
Apr. 1, 2019 (AU) .............................. 2019901098

(51) Int. Cl.
*G11B 27/036* (2006.01)
*G06F 3/0484* (2022.01)
(Continued)

(52) U.S. Cl.
CPC .......... *G11B 27/036* (2013.01); *G06F 3/0484* (2013.01); *G11B 27/005* (2013.01); *G11B 27/34* (2013.01)

(58) Field of Classification Search
CPC ..... G11B 27/036; G11B 27/005; G11B 27/34; G06F 3/0484
See application file for complete search history.

(56) References Cited

U.S. PATENT DOCUMENTS 5,519,828 A 5/1996 Rayner
7,805,678 B1 9/2010 Niles et al.
(Continued)

FOREIGN PATENT DOCUMENTS

WO 2007/082167 A2 7/2007
WO 2020/198793 A1 10/2020

OTHER PUBLICATIONS

Written Opinion of the International Searching Authority for Application No. PCT/AU2020/050322 dated Jun. 9, 2020, 7 pgs.
(Continued)

*Primary Examiner* — Thai Q Tran
*Assistant Examiner* — Jose M Mesa
(74) *Attorney, Agent, or Firm* — Seed IP Law Group LLP

(57) ABSTRACT

A software product includes a non-transitory computer readable medium storing instructions which, when executed by a processor, cause the processor to display a graphical user interface for a video editing system, the user interface including a media bin displaying one or more media elements imported into the video editing system; a viewing window for viewing a selected one of the media elements; a timeline; and a concatenator element; and responsive to a user actuating the concatenator element, concatenates the media elements present in the media bin together into a single media element and loads the single media element into the viewing window.

21 Claims, 2 Drawing Sheets

(51) Int. Cl.
*G11B 27/00* (2006.01)
*G11B 27/34* (2006.01)

(56) References Cited

U.S. PATENT DOCUMENTS

| | | | |
|---|---|---|---|
| 8,126,312 B2 | 2/2012 | Bushell et al. | |
| 8,156,176 B2 | 4/2012 | Lerman et al. | |
| 8,363,055 B1 | 1/2013 | Gregory et al. | |
| 8,621,355 B2 | 12/2013 | Eppolito et al. | |
| 8,819,557 B2 | 8/2014 | Matsuda et al. | |
| 8,966,367 B2 | 2/2015 | Meaney et al. | |
| 2001/0040592 A1 | 11/2001 | Foreman et al. | |
| 2002/0172498 A1* | 11/2002 | Esenyan | G11B 27/034 |
| 2003/0142124 A1 | 7/2003 | Takata et al. | |
| 2004/0071441 A1* | 4/2004 | Foreman | G06F 3/0483 |
| | | | 386/280 |
| 2006/0224940 A1 | 10/2006 | Lee | |
| 2007/0162857 A1 | 7/2007 | Weber et al. | |
| 2008/0253735 A1* | 10/2008 | Kuspa | G11B 27/34 |
| | | | 386/282 |
| 2010/0281372 A1 | 11/2010 | Lyons et al. | |
| 2010/0281384 A1 | 11/2010 | Lyons et al. | |
| 2012/0198317 A1 | 8/2012 | Eppolito et al. | |
| 2012/0206653 A1 | 8/2012 | Graves et al. | |
| 2012/0210219 A1 | 8/2012 | Agnoli et al. | |
| 2012/0210221 A1 | 8/2012 | Khan et al. | |
| 2013/0073964 A1 | 3/2013 | Meaney et al. | |
| 2013/0104042 A1 | 4/2013 | Meaney et al. | |
| 2013/0121668 A1 | 5/2013 | Meaney et al. | |
| 2013/0125000 A1 | 5/2013 | Fleischhauer et al. | |
| 2014/0115477 A1 | 4/2014 | Pendergast et al. | |
| 2014/0143671 A1 | 5/2014 | Kovalick | |
| 2015/0243325 A1 | 8/2015 | Pacurariu et al. | |
| 2016/0225405 A1 | 8/2016 | Matias et al. | |
| 2018/0336931 A1 | 11/2018 | Tandon et al. | |
| 2018/0358049 A1 | 12/2018 | Latulipe et al. | |
| 2020/0174649 A1 | 6/2020 | Diu | |

OTHER PUBLICATIONS

International Search Report for Application No. PCT/AU2020/050322 dated Jun. 9, 2020, 8 pgs.
Blackmagicdesign Reference Manual "DaVinci Resolve 14.3", Jan. 2018, 1346 pgs.
Blackmagicdesign Reference Manual "DaVinci Resolve 15", Aug. 2018, 2632 pgs.
Blackmagicdesign Reference Manual "DaVinci Resolve", Aug. 2020, 3590 pgs.
Extended European Search Report for EP Application No. 21207315.9, dated Apr. 8, 2022, 10 pgs.
Written Opinion of the International Searching Authority for Application No. PCT/AU2020/050320 dated Jun. 3, 2020, 4 pgs.
International Search Report for Application No. PCT/AU2020/050320 dated Jun. 3, 2020, 4 pgs.
International Search Report for Application No. PCT/AU2020/050795 dated Oct. 12, 2020, 7 pgs.
Written Opinion for International Search Report for Application No. PCT/AU2020/050795 dated Oct. 12, 2020, 4 pgs.
U.S. Appl. No. 17/453,733, filed Nov. 5, 2021.
U.S. Appl. No. 17/600,966, filed Oct. 1, 2021.
U.S. Appl. No. 17/632,163, filed Feb. 1, 2022.
Saccone, P. et al., Blackmagicdesign "The Definitive Guide to DAVINCI RESOLVE 15" 2019, 407 pgs.
Sengstack, J. "Edit sequences in the Premiere Pro Source Monitor into other sequences", https://helpx.adobe.com/premiere-pro/how-to/premierepro-edit-source-monitor.html, XP055982331, Mar. 18, 2013, 6 pages
Blackmagic Design "Blackmagic Design Announces DaVinci Resolve 16", https://www.blackmagicdesign.com/uk/media/release/20190408-05, XP055982519, Apr. 8, 2019, 2 pages.
Extended European Search Report for EP Application No. 20781753.7, dated Nov. 25, 2022, 10 pages
Extended European Search Report for European Application No. 20850686.5 dated Jun. 21, 2023, 12 pages.
First Chinese Office Action for Chinese Application No. 202080035245.1 dated May 23, 2023, 9 pages.
Apple Inc., "How you use the Canvas" Final Cut Pro 7 User Guide ("Final Cut Pro 7", 2010, https://prohelp.apple.com/finalcutpro_help-r01/English/en/finalcutpro/usermanual/index.html#chapter=7%26section=1, pp. 1-11) (Year: 2010).

* cited by examiner

MEDIA MANAGEMENT SYSTEM

BACKGROUND

Technical Field

The present disclosure relates generally to video editing software applications. More specifically, the present disclosure relates to a media management system for video editing software applications that, at least in preferred embodiments, provides users with a more efficient workflow environment.

Description of the Related Art

Film and/or video productions are created on video editing systems typically by assembling the project from a collection of constituent elements. Video editing systems allow these constituent elements—which include video clips, audiovisual clips, audio clips and associated metadata—to be separately imported and edited before being merged into the final production. Modern video editing systems (and particularly those used professionally in the film and television industry) include sophisticated video editing software applications. The Applicant's video editing system known as DaVinci Resolve® is an example of a modern video editing system that is extensively used in the professional environment. The total functionality of DaVinci Resolve® is divided into a number of separate pages (each having their own graphical user interface) that are organized in the order of a typical workflow. The DaVinci Resolve® pages include: Media (for media management and clip organization); Edit (a non-linear video editor); Color (for color correction and grading); Sound (a digital audio workstation); and Delivery (for final rendering or output).

In common with other non-linear video editors, the user interface of the Edit page of DaVinci Resolve® includes a timeline that is a graphical representation of the project being edited. The timeline includes a plurality of linearly spaced timecode markings that extend typically in a horizontal direction along the length of the user interface window. The timeline allows the constituent elements of the project to be arranged into the desired temporal order by alignment with the timeline's temporal markings. Once placed in the timeline, elements can be edited by launching editing tools to perform operations such as trimming, splitting, inserting, merging, and moving of clips to a desired location.

The present disclosure aims to provide a media management system for a video editing system that, at least in preferred embodiments, provides users with a more optimized video editing workflow environment

BRIEF SUMMARY

According to a first aspect of the present disclosure there is provided a software product including a computer readable medium storing instructions which, when executed by a processor, causes the processor to:
  display a graphical user interface for a video editing system, the user interface including:
    a media bin displaying one or more media elements imported into the video editing system;
    a viewing window for viewing a selected one of the media elements;
    a timeline; and
    a concatenator element; and
  responsive to a user actuating the concatenator element, concatenate the media elements present in the media bin together into a single media element and load the single media element into the viewing window.

According to one embodiment, the speed of playback of the single media element is varied by reference to a property of the media elements comprising the single media element. For example, the property may be the durations of the single media elements. According to this embodiment, the playback speed of media elements of a duration above a threshold value can be increased.

Preferably, the instructions, responsive to a user input, insert one of the media elements into the timeline. This inserted media element inserted is usually the media element that corresponds to the part of the single media element currently being viewed in the viewing window.

The graphical user interface may further include a defining object that is configured, responsive to a user input, to:
  define a start point and an end point for a media element being viewed in the viewing window;
  create a media element from the defined start and end points; and
  insert the created media element into the timeline.

According to a second aspect of the present disclosure, there is provided a method for providing a graphical user interface for a video editing system, the method comprising:
  displaying a graphical user interface including:
    a media bin displaying one or more media elements imported into the video editing system;
    a viewing window for viewing a selected one of the media elements;
    a timeline; and
    a concatenator element; and
  responsive to a user actuating the concatenator element, concatenating the media elements present in the media bin together into a single media element and loading the single media element into the viewing window.

According to one embodiment, the speed of playback of the single media element is varied by reference to a property of the individual media elements comprising the single media element. This can be the duration of the single media elements. In addition, the playback speed of media elements of a duration above a threshold value can be increased.

Preferably, the method includes, responsive to a user input, inserting one of the media elements into the timeline. This inserted media element can be the media element that corresponds to the part of the single media element currently being viewed in the viewing window.

The graphical user interface can further include a defining object that is configured, responsive to a user input, to:
  define a start point and an end point for a media element being viewed in the viewing window;
  create a media element from the defined start and end points; and
  insert the created media element into the timeline.

According to another aspect of the present disclosure, there is provided a method of playing a media file comprising a plurality of component files each having defined properties, the method including the step of varying the playback speed by reference to one or more of the properties of the component files.

The property may be the durations of the component files. Optionally, the playback speed of media elements of a duration above a threshold value is increased.

As used herein, except where the context requires otherwise, the term "comprise" and variations of the term, such as "comprising," "comprises" and "comprised," are not intended to exclude further additives, components, integers, or steps.

BRIEF DESCRIPTION OF THE SEVERAL VIEWS OF THE DRAWINGS

Further aspects of the present disclosure and further embodiments of the aspects described in the preceding paragraphs will become apparent from the following description, given by way of example and with reference to the accompanying drawings, in which.

DETAILED DESCRIPTION

Figure 1:
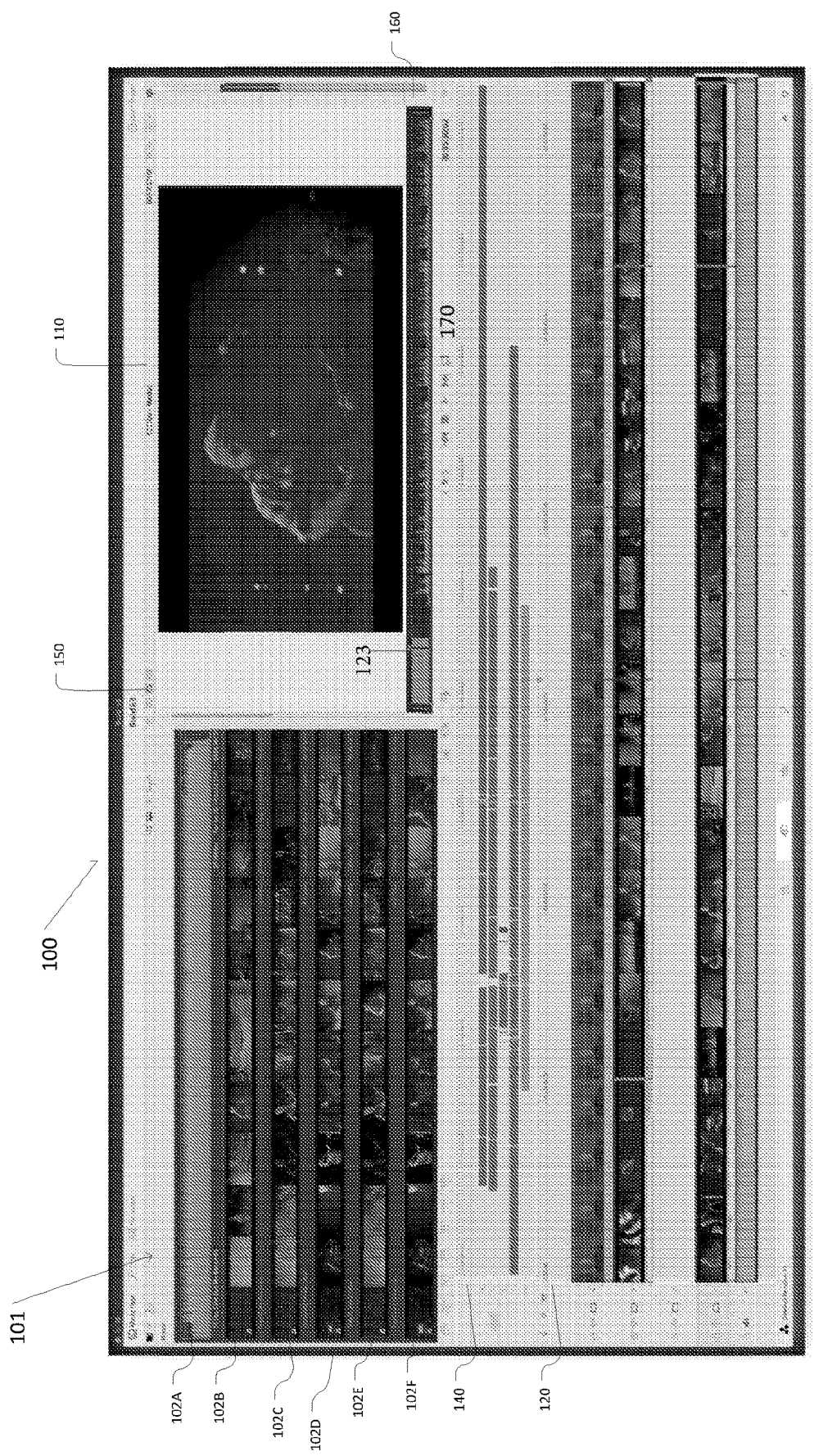
FIG. 1 is an illustration of a first view of a user interface according to an embodiment of the present disclosure.

A user interface 100 for a video editing software application is shown in FIG. 1. The video editing software allows for the creation of projects from constituent media elements that are imported into the video editing software application and displayed in a media bin area 101. In the illustrated embodiment, there is a single bin of media elements named 'Master,' however those skilled in the art will realize that any number of media bins can be created and media elements placed therein to provide a framework for organizing the project.

In the illustrated embodiment, the user has imported twelve constituent media elements in the project, six of which are shown in FIG. 1. The remaining media elements can be made viewable by operating the scroll bar located on the right hand side of the media bin area. The six visible constituent elements comprise an audio track 102A and five audio-visual clips 102B-102F (namely video clips each with a recorded audio track). As understood by skilled addressees, the video editing software application also stores and manages metadata for each constituent element, as well as for the overall project.

User interface 100 also includes a viewer window 110 for viewing a selected video or audio-visual clip, a first timeline 120 and second timeline 140 lying parallel and above first timeline 120. The operation of the two timelines is described in the Applicant's co-pending PCT patent application filed on even date, the contents of which are incorporated herein.

Timelines 120 and 140 allows users to create projects by inserting constituent media elements into of the timelines and performing editing and arrangement operations. In this regard, the individual source media elements 102B-102F can be dragged or otherwise inserted into one of the timelines 120 from media bin area 101 or viewer window 110. Once in a timeline, the constituent media elements can be suitably edited and arranged.

User interface 100 is streamlined in only displaying a subset of the usual user interface elements that are displayed on an editing page of DaVinci Resolve®. For example, user interface 100 does not include a separate viewer window for viewing video and audio-visual clips in the media bin area 101. The streamlined user interface 101 displays the core tools that are needed for certain projects, for example to import media, edit, trim, add transitions and titles, automatically match color, and mix audio.

Although only six constituent media elements are illustrated, it is not unusual for dozens or even hundreds of constituent media elements to be imported for potential use in a project. This can lead to difficulties in locating the desired clip from within all of the files present in the media bin area 101.

To address this issue, user interface 100 further includes a concatenator object in the form of a button 150. Button 150 can be suitably actuated by a user, typically in a single action such as by clicking, or by entering a keyboard shortcut linked to the button. In response to actuating the concatenator object, user interface 100 concatenates each of the media elements present in media bin area 101 into a single media element and loads the created media element into the viewer window 110. The user interface 100 displays the total number of media elements comprised in the single media element (in this case 12) and the name of the media bin that contains the media element currently being viewed in the viewer window 110 (in this case 'Master'). The total length of the single media element is also displayed in the user interface 100. In the illustrated embodiment, the element number, media bin identifier, and length, are displayed in the area above the viewer window, however this data could readily be displayed in other locations of the user interface 100.

When there are multiple bins created and displayed in the media bin area 101, the concatenation action can be performed to produce a single media element from the media elements present in a selected one of the bins, or from the content of multiple bins.

A graphical display object 160 is located underneath viewer window 110. In the illustrated embodiment, the entire single media element is depicted in graphical display object 160 as an audio waveform. In this depiction, users can easily identify particular clips, for example by inspecting the trough regions of the audio waveform, which indicate clips with low or zero volume.

The constituent media elements are indicated in graphical display object by vertical lines of a contrasting color (such as white).

Other depictions of the single media element can also be used, such as schematically illustrating the constituent media elements using simple geometric shapes such as rectangles. The constituent media elements can be distinguished in graphical display object 160, for example by using different colors for the schematic illustrations.

Having a single media element comprised of all of the media elements present in the media bin area allows the user to scrub through the single media element (at high speed if necessary) and easily locate the required constituent media element. High-speed scrubbing can be performed by manipulating a playhead 123, located in graphical display object 160. Other operations (including high-speed scrubbing) can be performed using viewer window controls 170 that are located below graphical display object 160.

Once located, the required media element can readily be inserted into one of the timelines 120 and 140, such as by dragging and dropping from the viewer window 110 or from graphical display object 160. The user interface 110 is configured to only insert into the timeline the individual media element currently being viewed in the viewer window 110, rather than inserting the entire single media element.

The order of the constituent media elements within the created single media element corresponds with the ordering of the constituent media elements in the originating media bin. However, the ordering of the individual source media elements within the created single media element can also be defined by the user and needn't follow the ordering of the elements within a media bin.

Display object 160 is configured to receive user input (such as a keyboard input, mouse click, or touch-screen display contact) and in response thereto, define start point and/or end points within the single media element while it is in the process of being played in the viewer window 110. Any new clips that are defined in this way (namely by the definition of a start point and a corresponding end point) are automatically loaded into one or both of the timelines 120 and 140. In the graphical display object 160, a plurality of start point and/or end points can be defined to add multiple clips defined by pairs of start and end points into the timeline 120 and 140. By presenting a concatenation of all the constituent media objects into a single media element and allowing multiple clips to be thus defined, the user workflow can be improved as it is no longer necessary to load individual clips into the timeline.

Once the multiple clips are present in the timeline 120 and 140, the boundaries thereof can be suitably edited, such as by trimming and/or extending. This functionality allows use of the display object 160 to create clips with approximate boundaries, which can then be refined using the editing tools of the timelines.

The concatenation of a plurality of media elements into a single media element effectively removes the start and end points that the individual elements inherently defined prior to the concatenation operation. This opens up the possibility of creating new media elements (namely by defining start and end points in the created single media element) that contain content from more than one of the original source media elements. Transition effects can then be readily inserted between the newly-created media elements.

Embodiments of the present disclosure are also concerned with an advantageous playback methodology that is performed on the created single media element. According to the methodology, the playback speed of the single media element is varied by reference to the properties of the individual source media elements that comprise the single media element. The methodology is implemented by retaining information about the properties of the source media elements (for example duration) after those elements have been concatenated into the single media element. The retained property information is then used to control the playback of the single media element.

One example of the playback methodology involves playing source media elements of a duration below a threshold value at their normal speed and playing source media elements of a duration above the threshold value at an increased speed. The increased playback speed can be the same irrespective of the durations of the requisite source media elements or can be varied in accordance with the individual durations of those source media elements.

Other playback-control methodologies can be defined using the present disclosure. For example, source media elements of a duration less than a threshold value can be ignored and the playback speed of the remaining elements varied. In other examples, a playback speed of the created media object at a given point may be determined by a function of the length of the source media element corresponding to that given point.

Figure 2:
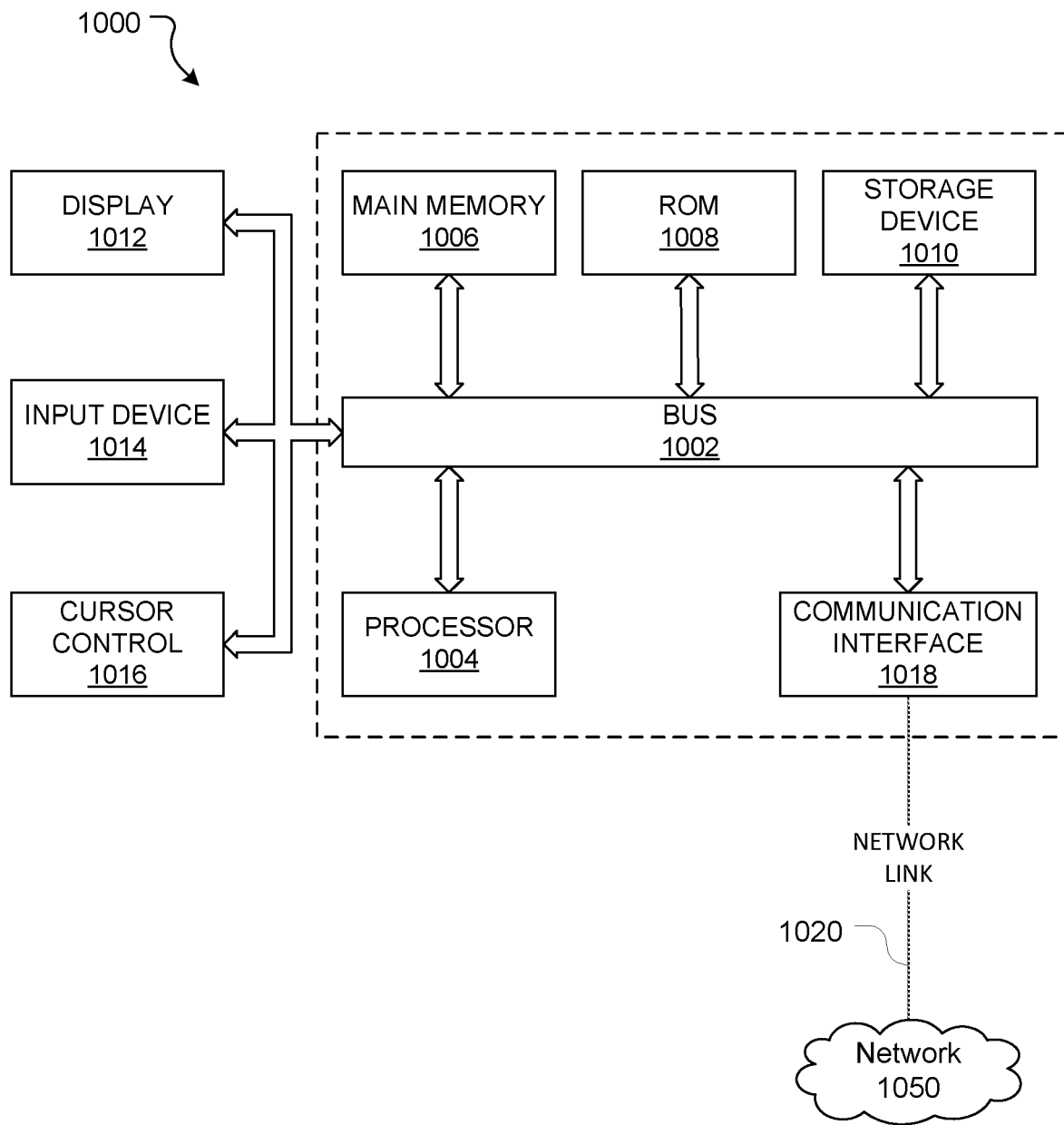
FIG. 2 is a schematic illustration of a hardware environment suitable for implementing the graphical user interface in accordance with an embodiment of the present disclosure.

FIG. 2 provides a block diagram that illustrates one example of a computer system 1000 upon which embodiments of the disclosure may be implemented. Computer system 1000 includes a bus 1002 or other communication mechanism for communicating information, and a hardware processor 1004 coupled with bus 1002 for processing information. Hardware processor 1004 may be, for example, a general purpose microprocessor, a graphics processing unit, other type of processing unit or combinations thereof.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions including the video editing software application described above.

The computer system 1000 may be coupled via bus 1002 to a display 1012 (such as an LCD, LED, touch screen display, or other display), for displaying information to a computer user, such as the graphical user interface described and illustrated above. An input device 1014, including alphanumeric and other keys, may be coupled to the bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012.

According to one embodiment, the techniques herein are performed by computer system 1000 in response to processor 1004 executing one or more sequences of one or more instructions contained in main memory 1006. Such instructions may be read into main memory 1006 from another storage medium, such as a remote database. Execution of the sequences of instructions contained in main memory 1006 causes processor 1004 to perform the process steps described herein. In alternative embodiments, hard-wired circuitry may be used in place of or in combination with software instructions.

The terms "storage media" or "storage medium" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Computer system 1000 also includes a communication interface 1018 coupled to bus 1002. Communication interface 1018 provides a two-way data communication coupling to a network link 1020 that is connected to a communication network 1050. For example, communication interface 1018 may be an integrated services digital network (ISDN) card, cable modem, satellite modem, etc. As another example, communication interface 1018 may be a local area network (LAN) card to provide a data communication connection to a compatible LAN. Wireless links may also be implemented.

In any such implementation, communication interface 1018 sends and receives electrical, electromagnetic or optical signals that carry digital data streams representing various types of information.

It will be understood that the disclosure disclosed and defined in this specification extends to all alternative combinations of two or more of the individual features mentioned or evident from the text or drawings. All of these different combinations constitute various alternative aspects of the disclosure.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A software product including a non-transitory computer readable medium storing instructions which, when executed by a processor, cause the processor to:
    display a graphical user interface for a video editing system configured to allow creation of a media project from individual media elements, the graphical user interface including:
        a media bin displaying individual media elements imported into the video editing system for potential use in said media project;
        a viewing window for viewing a selected one of the individual media elements;
        a timeline including temporal markings, said timeline being configured to display a graphical representation of said media project including graphical representations of individual media elements inserted into said media project, and being configured to enable arrangement of individual media elements into a temporal order by alignment with the timeline's temporal markings and editing of said individual media elements; and
        a concatenator element; and
    while simultaneously displaying the concatenator element, the media bin, the viewing window, and the timeline in the graphical user interface, and responsive to a user actuating the concatenator element:
        concatenate the individual media elements present in the media bin together into a single media element; and
        load the single media element into the viewing window.

2. A software product according to claim 1, wherein a speed of playback of the single media element is varied by reference to a property of the individual media elements comprising the single media element.

3. A software product according to claim 2, wherein the property is the durations of the individual media elements.

4. A software product according to claim 3, wherein a playback speed of individual media elements of a duration above a threshold value is increased.

5. A software product according to claim 1, wherein the instructions, responsive to a user input, cause the processor to insert one of the individual media elements into the timeline.

6. A software product according to claim 5, wherein the individual media element inserted into the timeline is the individual media element that corresponds to a part of the single media element currently being viewed in the viewing window.

7. A software product according to claim 1, wherein the graphical user interface further includes a defining object that is configured, responsive to a user input, to:
    define a start point and an end point for a new media element within said single media element being viewed in the viewing window;
    create said new media element using the defined start and end points; and
    insert the new media element into the timeline.

8. A method for providing a graphical user interface for a video editing system configured to allow creation of a media project from individual media elements, the method comprising:
    displaying a graphical user interface including:
        a media bin displaying individual media elements imported into the video editing system for potential use in said media project;
        a viewing window for viewing a selected one of the individual media elements;
        a timeline including temporal markings, said timeline being configured to display a graphical representation of said media project including graphical representations of individual media elements inserted into said media project, and being configured to enable arrangement of individual media elements into a temporal order by alignment with the timeline's temporal markings and editing of said individual media elements; and
        a concatenator element; and
    while simultaneously displaying the concatenator element, the media bin, the viewing window, and the timeline in the graphical user interface, and responsive to a user actuating the concatenator element:
        concatenating the individual media elements present in the media bin together into a single media element; and
        loading the single media element into the viewing window.

9. A method according to claim 8, wherein a speed of playback of the single media element is varied by reference to a property of the individual media elements comprising the single media element.

10. A method according to claim 9, wherein the property is the durations of the individual media elements.

11. A method according to claim 10 wherein a playback speed of individual media elements of a duration above a threshold value is increased.

12. A method according to claim 8, further including, responsive to a user input, inserting one of the individual media elements into the timeline.

13. A method according to claim 12, wherein the individual media element inserted into the timeline is the individual media element that corresponds to a part of the single media element currently being viewed in the viewing window.

14. A method according to claim 8, further including, responsive to a user input:
    defining a start point and an end point for a new media element within said single media element being viewed in the viewing window;
    creating a new media element using the defined start and end points; and
    inserting the new media element into the timeline.

15. A software product according to claim 7 wherein the start point and end point for the new media element are in different individual media elements that have been concatenated into the single media element.

16. A software product according to claim 1, wherein responsive to a user actuating the concatenator element, all of the individual media elements present in the media bin are concatenated together into the single media element.

17. A software product according to claim 1, wherein start and end points of individual media elements within the media bin are inherently defined by the individual media elements such that full individual media elements are concatenated together into the single media element.

18. A method according to claim 14, wherein the start point and end point for the new media element are in different individual media elements that have been concatenated into the single media element.

19. A method according to claim 8, wherein responsive to a user actuating the concatenator element, all of the individual media elements present in the media bin are concatenated together into the single media element.

20. A method according to claim 8, wherein start and end points of individual media elements within the media bin are inherently defined by the individual media elements such that full individual media elements are concatenated together into the single media element.

21. A computer system, including a processor executing one or more sequences of instructions contained in a memory, said instructions causing the computer system to perform a method as claimed in claim 8.

\* \* \* \* \*